United States Patent [19]
Girardin

[11] 3,711,675
[45] Jan. 16, 1973

[54] APPARATUS FOR HOLDING AND GUIDING AN ELONGATED ELECTRODE IN ELECTRO-EROSION MACHINING

[75] Inventor: Roger Girardin, Lausanne, Switzerland

[73] Assignee: Ateliers des Charmilles, S.A., Geneva, Switzerland

[22] Filed: March 27, 1972

[21] Appl. No.: 238,229

[30] Foreign Application Priority Data

March 31, 1971 Switzerland..........................4680/71

[52] U.S. Cl. ...............................219/69 E, 219/138
[51] Int. Cl. ...............................................B23k 1/08
[58] Field of Search ....................219/69 E, 138–144

[56] References Cited

UNITED STATES PATENTS 3,517,153  6/1970  Check..............................219/69 E Primary Examiner—R. F. Staubly
Attorney—Robert C. Hauke et al.

[57] ABSTRACT

A holder for supporting and guiding an elongated and relatively slender electrode in an electro-erosion apparatus, for example for drilling holes of a very small diameter in a workpiece. The holder comprises essentially a straight edge surface against which the elongated slender electrode is applied by fluid pressure. The fluid pressure may be the atmospheric pressure, conduit means being provided proximate the straight edge surface for exhausting atmospheric air by connection to a suction means, or the fluid may be any other fluid under pressure for exerting a force on one side of the electrode to apply it against the straight edge surface.

9 Claims, 7 Drawing Figures

APPARATUS FOR HOLDING AND GUIDING AN ELONGATED ELECTRODE IN ELECTRO-EROSION MACHINING

BACKGROUND OF THE INVENTION

Electro-erosion apparatus, more particularly electrical discharge machining apparatus, are advantageously used for some machining operations such as, for example, for drilling very small holes in a conductive workpiece. When drilling such small diameter holes, of the order of a few hundredths of a millimeter, the electrode consists of a slender conductive wire, for example made of copper, aluminum or tungsten. When the electrode wire has a very small diameter for example a diameter of a one hundredth or less of a millimeter, holding the electrode wire in an accurate position on an appropriate holder is a very delicate and complex proposition.

The present invention provides several means for securedly and precisely holding an electrode wire having a relatively small diameter which remedies the difficulties presented by prior art electrode wire holders, although it will be obvious to those skilled in the art that the invention can be used with advantage for holding any other elongated relatively slender electrode in electro-erosion machining apparatus.

SUMMARY

The main object of the invention, therefore, is to provide a holder for supporting and guiding an elongated relatively slender electrode, such as a wire electrode of relatively small diameter, in an electro-erosion apparatus by means of a support member providing a straight edge like surface defining a lateral support for the electrode and of at least one conduit for exhausting a fluid exerting a pressure urging the electrode against the straight edge surface.

The objects and advantages of the invention will become apparent when the following description of the best modes contemplated for practicing the invention is read in conjunction with the accompanying drawings wherein:

DETAILED DESCRIPTION OF THE PREFERRED EMBODIMENT

Figure 1:
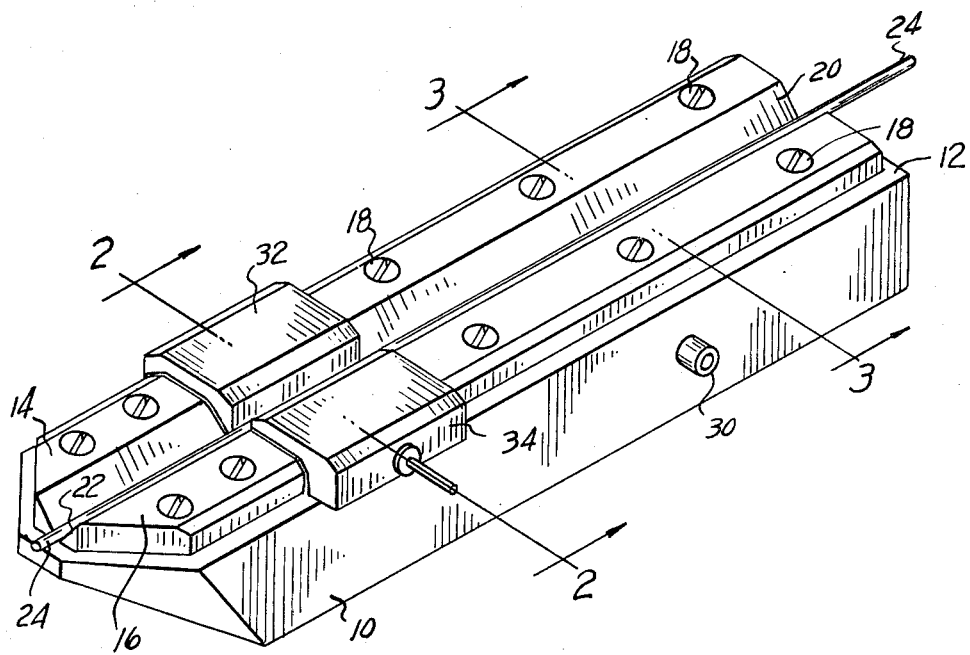
FIG. 1 is a schematic perspective view of an electrode holder according to the present invention.
Figure 3:
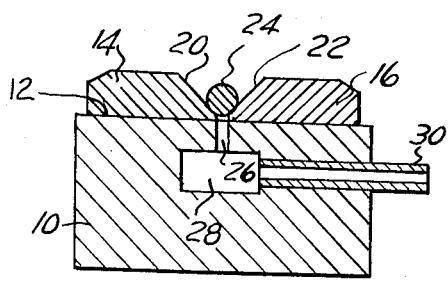
FIG. 3 is a transverse sectional view along plane 3—3 of FIG. 1.

Referring now to FIGS. 1 and 3, an electrode holder according to the invention comprises an elongated block or support member 10 having a planar face 12 on which is affixed a pair of symmetrically disposed guide members 14 and 16 fastened to the support member 10 by way of screws 18. In the example of structure shown at FIGS. 1 and 3, the juxtaposed sides of the guide members 14 and 16 form a pair of converging planar straight edge surfaces, respectively shown at 20 and 22, which are disposed at an angle so as to define a V-shaped channel for an electrode wire 24 disposed at the bottom of the channel. The electrode wire is held at the bottom of the V-shaped channel by atmospheric pressure, as a result of a suction being exerted at the bottom of the channel by means of one or several conduits 26 placing the apex or bottom of the V-shaped channel with a common manifold 28 connected to a suction means, such as a vacuum pump, not shown, by a pipe 30.

Figure 2:
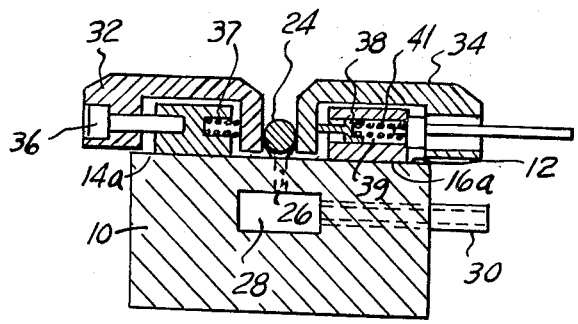
FIG. 2 is a transverse sectional view along plane 2—2 of FIG. 1.

As shown at FIGS. 1 and 2, the guide members 14 and 16 may be modified on a portion of their length to function as a pair of supports 14a and 16a for a pair of opposed jaw members 32 and 34 for laterally clamping the electrode wire 24 for feeding the wire longitudinally relatively to the guide members 14 and 16. The jaw member 32 is laterally movable relative to the support 14a by being supported and guided therefrom by means of a guiding and mounting bolt 33 transversely disposed therethrough, and the right hand end thereof is urged toward the wire electrode 24 by means such as spring 37. The jaw member 34 is laterally displaceable by means of a piston 38 operated by fluid pressure introduced and exhausted from a cylinder 39 formed in the support 16a, a return spring 41 causing the piston 38 and consequently the jaw member 34 to be displaced rightwardly by the return spring when fluid is exhausted from the cylinder 39. The wire electrode 24 is thus clamped and unclamped between the two jaw members 32 and 34 according to whether or not fluid is introduced in the cylinder 39. Appropriate means, not shown, such as a fluid actuated cylinder or a screw driven by an appropriate motor, may be provided for displacing the jaw members 32 and 34 in unison relatively to the supports 14a–16a such as to provide a limited longitudinal feeding of the electrode wire 24 to compensate for wear of the electrode wire 24. It is obvious that other arrangements may be utilized for feeding the electrode wire 24 relative to the support member 10 and guide members 14–16 to compensate for wear of the electrode wire.

In operation, the support member 10 is mounted on a portion of the electro-erosion apparatus, such as the ram of the apparatus, which is displaceable relatively to a workpiece, not shown, appropriately supported on the bed of the apparatus. The workpiece and the electrode holder are connected across a power supply of electrical pulses, and the tip of the electrode wire 24 and the workpiece are submerged in a dielectric fluid through which the electrical discharges are effected as is well known in the electrical discharge machining art.

In the arrangement of FIGS. 1–3, the electrode wire 24 has a substantially circular section, and the guiding arrangement provided, consisting of two straight edge surfaces 20 and 22 disposed at a relative angle so as to form a V-shaped channel, together with the holding arrangement, consisting of the atmospheric pressure applying the elongated relatively slender electrode wire 24 to the bottom of the V-shaped channel, in combination provides an accurate holding and guiding of the circularly cylindrical electrode wire 24. However, the invention may be adapted to hold electrode wires of any dimension and shape, as illustrated at FIGS. 4–7.

Figure 4:
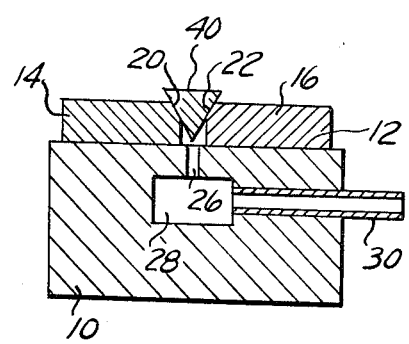
FIG. 4 is a view similar to FIG. 3 but showing a modification of the invention.

An arrangement substantially like the arrangement of FIGS. 1–3 is shown at FIG. 4, with guide members 14 and 16 provided respectively with straight edge surfaces 20 and 22. The straight edge surfaces 20 and 22 form two planar surfaces disposed at an angle of 60° for engaging the two consecutive sides of an electrode wire 40 having a cross section in the form of an equilateral triangle. The guide members 14 and 16 are disposed parallel to each other but are separated by a distance which, combined with the straight edge surfaces 20 and 22 thereon being disposed as a bevel at the corner edge of each guide member, provide an appropriate clearance for the edge of the wire 40 projecting toward the planar surface 12 of the support member 10. It is obvious that the arrangement of FIG. 4 can be adapted to diverse sectional shapes of electrode wires, such as wires having a triangular, hexagonal, square, or parallelogram cross section, the straight edge surfaces 20 and 22 being disposed at an appropriate angle for engaging two fat consecutive or non-consecutive sides of the electrode wire.

Figure 5:
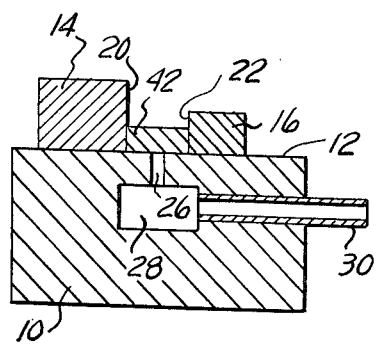
FIG. 5 is a view similar to FIG. 4 but showing a further modification of the invention.
Figure 6:
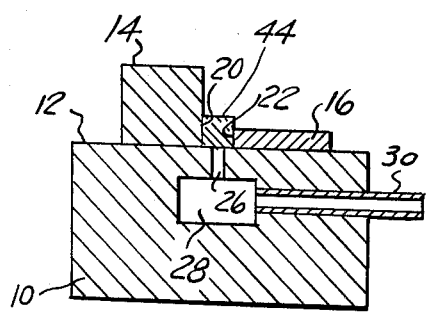
FIG. 6 is a view similar to FIG. 5 but showing a further modification of the invention.

When the electrode wire has a cross section which is rectangular, as shown at FIG. 5 at 42, each of the guide members 14 and 16 is provided with a planar side 20 and 22 respectively, disposed at a right angle to the upper planar surface 12 of the support member 10. The electrode wire 42 is disposed between the two straight edge surfaces 20 and 22 and is maintained against the upper surface 12 of the support member 10 by atmospheric pressure, atmospheric air being exhausted through the conduit 26 leading into the vacuum manifold 28. A similar arrangement is shown at FIG. 6 for an electrode wire 44 having a square cross section.

Figure 7:
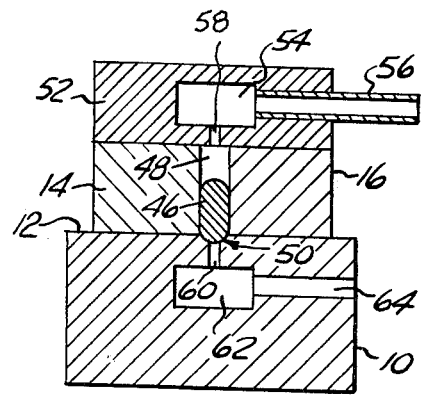
FIG. 7 is a view similar to FIG. 6 but showing an additional modification of the invention.

Although the embodiments of FIGS. 1–6 showing the electrode wire being maintained at the bottom of the appropriate guide channel by way of the ambient atmospheric pressure, a suction being exerted on the electrode wire at the bottom of the guide channel by way of exhaust conduits 26, are very convenient means for holding an electrode wire in an electrode holder, it is, however, possible to hold the electrode wire at the bottom of the guide channel by a fluid pressure, either gaseous or liquid, other than atmospheric pressure, exerted on a side of the electrode wire and tending to urge the electrode wire against the bottom of the guide channel in the electrode holder. Such an arrangement is illustrated at FIG. 7 wherein an electrode wire 46, which, in cross section, is shaped as a relatively flat member having opposite flat parallel sides connected by curved surfaces, is disposed in a closed channel 48 formed between the two parallel guide members 14 and 16 separated from each other by a constant distance substantially corresponding to the thickness of the electrode wire 46. The bottom of the channel 48 is defined by a groove 50 of a contour corresponding to the curved side of the electrode wire 46 and formed on the planar top surface 12 of the support member 10. The top of the channel 48 is closed by a block 52 provided with a manifold 54 in which a fluid under pressure is introduced by means of a pipe 56. The manifold 54 is placed in communication with the channel 48 by means of a plurality of conduits 58 so as to introduce the fluid under pressure into the channel 48, the fluid leaking around the electrode wire being exhausted by means of passageways 60 disposed at the bottom of the channel 48 and communicating with a common manifold 62 connected to ambient by conduit 64. In this manner, the electrode wire 46 is constantly applied in the channel 48 against the guiding groove 50, the groove 50 forming the equivalent of the straight edge surfaces of the previously disclosed embodiments.

Having thus described the invention by way of examples of practical embodiments thereof, modifications whereof will be apparent to those skilled in the art, what is claimed as new is as follows:

1. A holder for supporting and guiding an elongated relatively slender electrode in an electro-erosion apparatus, said holder comprising an elongated support member, at least one straight edge surface on said support member for defining a lateral support surface of said electrode, and fluid pressure means for urging said electrode against said straight edge surface.

2. The holder of claim 1 comprising a pair of straight edge surfaces angularly disposed one relative to the other.

3. The holder of claim 1 comprising at least one conduit having an inlet disposed proximate said straight edge surface and an outlet connected to suction means for exhausting said fluid.

4. The holder of claim 2 comprising at least one conduit having an inlet disposed proximate said straight edge surfaces and an outlet connected to suction means for exhausting said fluid.

5. The holder of claim 4 wherein said conduit is disposed at the apex of said angularly disposed straight edge surfaces.

6. The holder of claim 3 comprising a plurality of said conduits disposed in a row and connected at their outlet to a common suction manifold.

7. The holder of claim 4 comprising a plurality of said conduits disposed in a row and connected at their outlet to a common suction manifold.

8. The holder of claim 5 comprising a plurality of said conduits disposed in a row and connected at their outlet to a common suction manifold.

9. The holder of claim 1 comprising an outlet of fluid under pressure disposed on one side of said electrode, and at least one conduit for exhausting said fluid disposed on the other side of said electrode proximate said straight edge surface.

* * * * *